United States Patent [19]

Konstantin et al.

[11] Patent Number: 5,575,917
[45] Date of Patent: Nov. 19, 1996

[54] PROCESS FOR IMMOBILIZING LINEAR POLYMERS ON A CHEMICALLY INERT CARRIER MATERIAL, ANTIMICROBIAL MATRIX PRODUCED ACCORDING TO THIS PROCESS ON THE BASIS OF AN INERT CARRIER MATERIAL AND A COATING OF POLYIONENES AND USE OF SAID MATRIX

[75] Inventors: Peter Konstantin, Neunkirchen; Michael Rinck, St. Ingbert-Hassel, both of Germany

[73] Assignee: Fresenius AG, Bad Homburg, Germany

[21] Appl. No.: 143,685

[22] Filed: Oct. 27, 1993

[30] Foreign Application Priority Data

Nov. 6, 1992 [DE] Germany ............ 42 37 493.6

[51] Int. Cl.$^6$ ............................................ B01D 69/02
[52] U.S. Cl. .................................................. 210/638
[58] Field of Search ........................ 210/500.21, 500.27, 210/500.37, 500.41, 490, 506, 645, 654, 638; 428/402; 604/891.1; 427/244, 245, 246; 435/423

[56] References Cited

U.S. PATENT DOCUMENTS

| | | | |
|---|---|---|---|
| 3,899,534 | 8/1975 | Rembaum et al. | 424/78 |
| 3,927,242 | 12/1975 | Rembaum et al. | 428/411 |
| 4,046,750 | 9/1977 | Rembaum | 526/310 |
| 4,073,504 | 2/1978 | Ostreicher et al. | 210/500.37 |
| 4,075,136 | 2/1978 | Schaper | 428/511 |
| 4,534,996 | 8/1985 | Rembaum et al. | 427/44 |
| 4,791,063 | 12/1988 | Hou et al. | 435/243 |
| 4,802,984 | 2/1989 | Waite | 210/490 |
| 4,980,067 | 12/1990 | Hou et al. | 210/638 |

FOREIGN PATENT DOCUMENTS

3801690A1  8/1988  Germany .

*Primary Examiner*—Frank Spear
*Attorney, Agent, or Firm*—Robbins, Berliner & Carson

[57] ABSTRACT

A process for the immobilization of a linear polymer, in particular a polyionenes, which is soluble in an aqueous solvent, on a chemically inert carrier material and a matrix having an antimicrobial effect are provided, which are suitable for, in particularly intracorporeally applied, medical appliances and in the form of microporous membranes as filters for water purification or, in the form of beads, as a surface disinfectant. The process is characterized in that the two terminal reactive groups of the linear polymer are reacted with an excess of an alpha, omega-bifunctional compound, the reaction product obtained is dissolved in a hydrophilic solvent and applied at least once to the carrier material and then cross-linked with a cross-linking agent dissolved in a hydrophobic solvent which is chemically inert to the cross-linking agent and the carrier material.

11 Claims, No Drawings

PROCESS FOR IMMOBILIZING LINEAR POLYMERS ON A CHEMICALLY INERT CARRIER MATERIAL, ANTIMICROBIAL MATRIX PRODUCED ACCORDING TO THIS PROCESS ON THE BASIS OF AN INERT CARRIER MATERIAL AND A COATING OF POLYIONENES AND USE OF SAID MATRIX

The invention concerns a process for immobilizing linear polymers soluble in a hydrophilic solvent on a chemically inert carrier material, a coated matrix of antimicrobial effect based on an inert carrier material and a coating of polyionenes, as well as the use of said matrix.

It is known to attach linear polymers, such as e.g. polyionenes, to a polymeric carrier material by means of covalent bonding, if appropriate under insertion of a spacer, and to thus immobilize them on the carrier.

From the U.S. Pat. No. 4,791,063 reaction products of specific polyionenes with modified polysaccharides acting as the carrier material in form of a self-supporting fibre matrix became known and were proposed for use as antibacterial separator media for ionen exchange, affinity and reverse phase chromatography and as carriers for bioreactors.

These products are produced by decomposition of polyionenes with the reactive hydroxyl groups of the modified polysaccharide acting as the carrier material, if necessary after introducing additional reactive groups into the polyionenes and, if appropriate, under inclusion of spacers.

As a result of the strong covalent bond between the carrier material and the polyionenes acting as the coating material, these reaction products display considerable resilience to leaching or wash-out during use in liquid media capable of dissolving non-immobilized or insufficiently immobilised polyionenes, such as, in particular, hydrophilic e.g. aqueous media. Due to the strong chemical bond of the polyionenes to the carrier material, if appropriate via interposed spacers, a more or less pronounced change of their chemical and/or antimicrobial properties can, however, not be precluded, which is undesirable, for instance if this change results in a reduction of the antimicrobial effect.

It is a precondition of such a production process that the carrier material is also chemically reactive, so that this process is generally not suited for immobilizing linear polymers on chemically inert carrier materials, e.g. materials made of metal and polymers such as polysulfones, poly(tetrafluorethylenes), silicons and the like, and can only succeed if spacers are introduced in the polymeric carrier material, thus necessitating a further complex process step.

From the U.S. Pat. No. 3,899,534 papers and textiles coated or impregnated with water-insoluble cross-linked polyionenes are known, which display an antibacterial effect. They are obtained by means of polymerization of a ditertiary amine with a di-(halogene-methylized) aromatic compound and simultaneous cross-linking on the substrate, on condition that one of the two monomeric reaction partners is at least trifunctional. The polycondensates thus generated in situ, however, are strongly modified polyionenes with a high content of residues of the aromatic comonomers acting as the cross-linking agent, said comonomers being alternatingly condensated into the polycondensates. As a result, the layer material displays major changes of its molecule structure and thus also in its chemical and/or antimicrobial properties, compared to unmodified polyionenes.

From the DE 38 01 690 Al a polymeric membrane is known, which contains a polyionene complex formed by means of association on the surface of and/or in the membrane. The interaction is ionic in character and the resulting polyionene complex is an aggregate wherein the polymer molecules are associated with each other through multiple ionen bonds into a three-dimensional structure. The membrane according to the DE 38 01 690 Al is produced by a process comprising the insolubilization of a membrane of a cationic or anionic polymer by means of cross-linking, followed by immersion in a solution of an anionic or cationic polymer.

The DE 38 01 690 Al further proposes a process for producing a composite membrane, whereby a skin layer of anionic polymer is insolubilized on a porous polymer membrane by means of cross-linking and is subsequently immersed in a solution of a cationic polymer, so as to transform the anionic polymer of the skin layer into a polyionconcentratione complex.

Due to the ionic interaction required, the process according to the DE 38 01 690 is always confined to polymer pairs charged in opposite direction.

SUMMARY OF THE INVENTION

The present invention thus proceeds from the main problem of providing a process of optimal simplicity and economy for immobilizing linear polymers, preferably polyionenes, soluble in hydrophilic solvents on a chemically inert carrier material, e.g. of metal or polymeric resin, preferably polysulfone, whereby said process is to provide products which display an optimally firm bond of the linear polymer to the inert carrier material and therefore show good resilience to wash-out of the linear polymer by the medium during use in liquid, in particular hydrophilic, e.g. aqueous, solutions, without there being any substantial impairment of the original chemical and/or antimicrobial properties of the linear polymer. The desired firm bond is hereby not to be achieved by means of covalent bonding, and the linear polymer to be immobilized is to be introduced in the process as such and not in the form of the constituent monomers, so as to preclude the above-described disadvantages from the outset.

The invention proceeds from the further problem of providing a matrix produceable according to the above process and consisting of a chemically inert and biocompatible material and a biocompatible coating of local antimicrobial effect, preferably consisting of polyionenes, whereby said effect is to last as long as possible upon contact with liquid media, in particular aqueous media such as body fluids, or water, and wash-out of the coat by the liquid media is to be avoided. The coated matrix is to be suited to act as a surface disinfection agent, in particular in the form of e.g. intracorporeal catheters, vascular prostheses, pacemakers, intra-uterine and intra-peritoneal tubes or vasal tubes and the like for medical apparatus, in the form of coated membrane filters for water purification or in the form of coated beads.

When the matrix is applied intra-corporeally in the form of medical apparatus, its antimicrobial coat should give rise neither to resistance phenomena nor to systemic effects caused by wash-out.

A need exists for such coated matrices made of materials such as metals or polysulfone, not only due to their chemical resilience and biocompatibility, but also due to their specific physical properties which may be of benefit, e.g., for design.

It is known that, in particular during long-term use of intracorporeally applied appliances such as permanent catheters, vascular prostheses, pace-makers, intra-uterine and intra-peritoneal appliances, e.g. tubes for peritoneal dialysis or vasal inlets, fixators and the like, bacteria causing infections settle on the surface of these appliances. Such colonies present a permanent source of infections. This phenomenon was observed both in medical apparatus applied intracorporeally made of metal, e.g. rustproof steel or tantalum, and in apparatus made of the polymeric resins customarily used in medical technology, such as those consisting of natural or synthetic rubber, polyethylene, polypropylene, polyamide, poly(tetrafluorethylene), polysulfone, PVC, PVP, silicon and polyurethane.

It has so far been attempted to deal with these problems by coating the biomedical apparatus made of synthetic resin with, inter alia, antibiotics or disinfectants (chemically nonreactive) or by admixing said substances to the synthetic resins.

The U.S. Pat. No. 4,542,169 thus describes biomedical appliances, for example for intra-uterine or intra-peritoneal application made of natural, synthetic and silicon rubber, polypropylene, polyamide or polyurethane, into which certain isothiozalones were mixed as an antimicrobial agent and appliances (physically) coated with such an agent.

Such appliances, however, display the disadvantage that the antimicrobial agent is sufficiently immobilized on the polymeric resin forming the base of the appliance, so that the appliances gradually lose their effectiveness as a result of "wash-out" resp. migration of the agent in the course of the long-term application generally required in the case of catheters, vasal inlets, fixators and the like. Moreover, migration of the antimicrobial agent into areas of the body outside the local application site may give rise to undesirable systemic effects. If the active agent is an antibiotic the problem of resilience may also result.

The subject of the invention is a process for immobilizing polyionenes soluble in a hydrophilic solvent on an inert carrier material, characterized in that the two terminal reactive groups of the linear polymer are reacted with an excess of an alpha-, omega-bifunctional compound, that the reaction product obtained thereby is dissolved in a hydrophilic solvent and applied at least once to the carrier material and then Cross-linked with a cross-linking agent dissolved in a hydrophobe solvent which is inert against the cross-linking agent and the carrier material, whereby the polyionenes introduced into the process is one of the following general formula I,

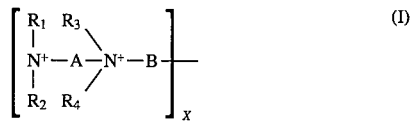

wherein x represents the degree of polymerization, $R_1$, $R_2$, $R_3$ and $R_4$, which may be identical or different, respectively represent straight or branched-chain alkyl groups with 1 to 4 carbon atoms and A as well as B, which may be identical or different, respectively represent one of the groups —CH$_2$—, —C$_2$H$_4$— or

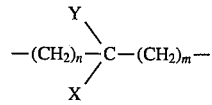

on condition that the sum of the carbon atoms in the two groups A and B is at least 6, whereby n and m respectively are a full number between 1 and 16, X and Y respectively are —H, —CH$_3$, —OH, —CHO, —NH$_2$, NHZ, —N(Z)$_2$, Z is an alkyl group with 1 to 4 carbon atoms, whereby both substituents may be equal to Z or differ therefrom, or the group

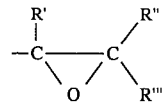

wherein R', R" and R'", which may be identical or different, respectively represent one hydrogen atom or one alkyl group with 1 to 6 carbon atoms, or X and Y together represent one oxygen atom, whereby the molecular weight of the polyionenes is in the range of 10,000 to 100,000, in particular 20,000 to 80,000 Dalton. A polysulfone, an optionally modified polysulfone, is preferably used as the inert carrier material.

In executing the process using a polyionenes as the linear polymer, an alpha, omega-diamino compound, preferably a long-chain alpha, omega-diamino compound, is used as the bifunctional compound and a reactive derivative of an, in particular long-chain, alpha, omega-dicarbon acid, such as dihalogenide or diester, is preferably used as the cross-linking agent, whilst methanol is preferred as the hydrophilic solvent for the reaction product. The term "long-chain" hereby refers to compounds comprising approximately 8 or more carbon atoms in their straight chain.

The process according to the invention is based on the use of the linear-polymerized pre-products which are used in unmodified state as the coating material for the reaction carrier materials, i.e. the use of substances such as normal polyionenes as such and not in the form of their constituent monomers. In the first process step they are provided with chemically identical chain ends by means of decomposition with an excess of a bifunctional compound, in the case of polyionenes preferably a long-chain alpha, omega-diamine such as e.g. 1,8-diamino-octane. This reaction produces linear polymers which are still well soluble in hydrophilic solvents and therefore easy to apply to the most diverse surfaces of the carrier materials. Methanol is particularly suited as the solvent because it ensures good wetting and low surface tension. The solution of the reaction product obtained in the first process step in a hydrophilic solvent may be applied to the carrier material by means of immersion or other conventional methods; to obtain layers of sufficient thickness this procedure may be repeated several times in succession, whereby a drying step is respectively interposed.

The carrier materials thus coated are then immobilized on the surface of the carrier material by means of cross-linkage in a second process step. For this purpose the coated material is treated with a solution of a linear, in particular a long-chain alpha, omega-bifunctional compound which acts as the cross-linking agent and whose reactive end groups are chemically adapted to the end groups of the alpha, omegabifunctional compound used in the first process step. In the case of polyionenes closed in the first process step-by terminal diamino groups, specific reactive derivatives of an, in particular long-chain alpha, omega-dicarbon acid, in particular alpha, omega dicarbon acid halegonides or esters, such as e.g., 8-dodecandicarbon acid dichloride, are particularly suited to act as the cross-linking agent. In this second process step a hydrophobic solvent is used, in particular a hydrocarbon which, due to its hydrophobic nature, neither detaches the layer or layers applied in the first process step nor corrodes the carrier material used. Finally, polyionenes products which are not or insufficiently cross-linked are removed by washing with water.

The process products unexpectedly proved to be of extremely low water-solubility, although they only contain few hydrophobic alkyl fragments of the cross-linking agent in proportion to the charged hydrophilic ammonium groups. They therefore display a degree of immobility which has until now only been achievable by generating a covalent bond between the coating material and the camel Since the actual chains of the linear polymers, such as e.g. the polyionenes chains, are chemically modified and cross-linked only in their end sections, the properties of the original linear polymers are largely preserved.

In the process products the surface of the inert carrier material is covered with a relatively flexible net of linear polymers such as polyionenes, whose mesh width is determined both by the degree of polymerization of the respective linear polymers and by the length of the cross-linking agents used.

If desired, the properties of the coating material can be varied by chemical modification, including modification of the cross-linking agent; for example, linear polymers with suitable ends groups, such as e.g. carbon acid halogenides, may be used for this purpose too. If desired, repeated coating based on different polyionenes may be carried out in the first process step.

A further subject of the invention is a matrix with an antimicrobial effect on the basis of an inert carrier material and a coat consisting of polyionenes, characterized in that the polyionenes, without forming covalent bonds, are so firmly bound to the inert material that they lose their solubility in water. The polyionenes are preferably present in the layer in substantially unmodified molecular structure.

The inert material is preferably a polymeric resin, in particular a polysulfone.

Such matrices can be obtained by the process according to the invention described above, if a polyionenes, preferably one belonging to the above-defined general Formula I is introduced as the linear polymeric base material, a preferably long-chain alpha, omega-diamino compound, such as e.g. 1,8 diamino octane, is used as the bifunctional compound in the first process step and a reactive derivative of an, in particular long-chain, alpha, omega-dicarbon acid, such as e.g. dichloride or diester, is used as the cross-linking agent in the second process step.

A further subject of the invention is the use of the matrices according to the invention in particular for medical appliances to be applied intracorporeally, in the form of microporous membranes as filters for water-purification or in the form of beads as surface disinfectants. Catheters and tubes are examples of the medical appliances for intracorporeal application applied permanently, for example in peritoneal dialysis or drainage. Further examples of such medical appliances are vascular prostheses, pace-makers and vasal inlets, e.g. in the form of tubes.

As a result of the extremely effective immobilisation of the polyioneness, which are themselves hydrophilic, on the basic matrix consisting of a conventional inert material commonly used in medical technology, the medical appliances consisting of the matrix according to the invention do not display the disadvantages mentioned above which are commonly displayed by such appliances. They are, on the contrary, excellently suited for long-term use, since, as a result of their immobilization, the antimicrobial effect of the polyionenes is preserved locally in the application site for a long period and their biocompatibility is sustained, whereby they prevent the formation of a biofilm on the appliance and no systemtic effect occurs.

The same applies to microporous membranes made of the matrix according to the invention, which can be used as filters in water purification and the like.

A coated matrix according to the invention based on a modified or unmodified polysulfone is preferably used for the above purposes.

The following adhesion tests conducted with bacteria show that no settlement of bacteria, i.e. no biofilm formation, occurs on the matrices according to the invention. The matrices according to the invention are also biocompatible; a mutagenic or cytotoxic effect can be precluded on the basis of the performed tests.

The concept "polyionenes" was first coined in 1968 (viz. *Polymer Letters* 6, pp. 159 to 171 (1968)) and has in the meantime become generally accepted in the scientific communication, including the Chemical Abstracts, and beyond. It refers to polyanionic and polycationic polymerizates with polyquaternary ammonium groups, which are separated, for example, by identical or different aromatic or aliphatic residues. The number of "ions" in the nomenclature refers to the chain length of these residues between the quarternary $NH^+_4$ groups.

The polyionenes of the general Formula I can be produced by conventional means by decomposition of the respective dihalogene compounds with secondary or tertiary amines (viz. e.g. U.S. Pat. Nos. 4,038,318, 3,898,188, 3,910,819, 3,927,242 and 4,013,507). A number of cationic polyionenes is commercially available.

The polyionenes of the general Formula I are preferably used in the form of their bromides or chlorides which display very good solubility in water.

EXAMPLE 1

The process according to the invention is now described in more detail by reference to the immobilization of polyionenes as the linear polymers soluble in a hydrophilic solvent. 10 g of the polyionenes (in the form of its chloride or bromide salt) are heated for 2 hours up to boiling point with 5 g 1.8-diamino-octane in 100 ml chloroform. After cooling, the reaction solution is agitated with acetone and the precipitated material is removed by suction.

1 g of the reaction product thus obtained is dissolved in 100 ml methanol. The solution is applied as a coat by means of immersion of the inert carrier material to be coated, e.g. a tube, a membrane or beads. After drip-off, the coated product is dried, e.g. in a drying cabinet at 80° C. If desired, this coating process may be repeated several times.

The form body was pre-treated is then treated, e.g. by immersion, with a solution of 1 g 1.8-dodecandicarbon acid dichloride in 100 ml of a hydrocarbon, e.g. cyclohexane, under addition of approximately 2 ml of a proton acceptor such as ethyl diisopropylamine, whilst said solution is heated for a period of approximately 1 hour. Subsequently the formed body thus treated is repeatedly washed with water.

EXAMPLE 2

The antibacterial and antiviral effect of different polyionenes coating materials in the presence of different bacteria resp. *legionella pneumophila* was first determined. The results are compiled in Tables 1 to 7 below.

The tested polyionenes (substances 1, 3, 5, 6, 6A, 6B and 6C) were produced by conventional means by decomposition of the respective omega-dihalogenides with the corresponding tert. amines.

1. Antimicrobial effect of polyionenes used as coating material 1.1 Determination of the minimal inhibition concentration (MIC) and minimal bactericide concentration (MBC) on clinically isolated bacteria test strains.

Test method: The substances to be tested are dissolved, if necessary under short-term heating to 80°–90° C., in aqua destillata or $D_2O$. Strain solutions are produced in a concentration of 2560 μg/ml, which are then diluted for the test first to 1:10 and then serially diluted further by halving the respective concentrations.

The determination of the minimal inhibition concentration (MIC) was carried out according to the microtiter method. The test strains were incubated in Müller Hinton Medium for 18 hours at 35° C. Subsequently, suspension with a turbidity standard corresponding to McFarland No. 0.5 (app. $5\times10^7$ KBE/ml) were produced. This suspension was further diluted to 1:50 and then used as an inoculum. 0.05 ml bacteria suspension were pipetted into each cup of microtiter plates. The plates were incubated for 18 hours at 35° C. The MIC was defined as the concentration at which nomacroscopically visible growth was detectable. To determine the minimal bactericide concentration (MBC) at which no reproducible bacteria are detectable at all, the contents of the cups showing no growth were plated out on blood agar plates.

The following polyionenes were tested:

The results are presented in Tables 1–7. The symbol+ designates microscopically visible growth and the symbol— microscopically invisible growth (MIC determination); the corresponding symbols in round brackets indicate whether surviving bacteria were detected in the cups without growth (MBC determination).

In the tests according to Tables 1–4 the MIC and MBC were in most cases approximately the same. Only in one case, i.e. Substance No. 1 with *candida albicans* as the test bacteria, the MBC was at least 5 dilution stages higher than the MIC.

In the tests according to Tables 5 to 7, which were resp. had to be carried out after a considerable interval and thus with different test strains, the MBC values were partially significantly higher than the MIC values, as far as the test bacteria *candida albicans* and *strept. faecalis* are concerned. In view of the difference in test strains, the results according to Tables 1 to 4 are only conditionally comparable to those according to Tables 5 to 7. The test results confirm an overall high antimicrobial effect of the tested polyionenes, with differences of degree depending on their composition and the type of test strain. The test results obtained with three fractions of different molecular weight of an identical compound (No. 6) according to Tables 5 to 7 show that, at least in the molecular weight range examined (app. 20,000 to 80,000 Dalton), the antibacterial effect does not significantly depend on the chain length resp. the molecular weight of the polyionenes.

| Substance No. | Short name | Cation struction acc. gen. Formula I | MG (Dalton) × $10^3$ |
|---|---|---|---|
| 1 | 2.10-ionen iodide | $R_1, R_2, R_3$ and $R_4$: resp. $-CH_3$; $A = -C_2H_4$; $B = -(CH_2)_n\overset{X}{\underset{Y}{C}}(CH_2)_m$ whereby $n = 1, m = 8$ and X and Y resp. H | app. 50–60 |
| 3 | 6.10-ionen iodide | $R_1, R_2, R_3$ and $R_4$: resp. $-CH_3$; $A = -(CH_2)_n-\overset{X}{\underset{Y}{C}}-(CH_2)_m-$ whereby $n = 1, m = 4$ and X and Y resp. H $B = -(CH_2)_n-\overset{X}{\underset{Y}{C}}-(CH_2)_m-$ whereby $n = 1, m = 8$ and X and Y resp. H | app. 50–60 |
| 5 | 2.10-ionen bromide | (viz. Subst. No. 1) | app. 50–60 |
| 6 | 6.10-ionen bromide | (viz. Subst. No. 2) | app. 50–60 |
| 6 A | | " | 70 to 80 |
| 6 B | | " | 40 to 50 |
| 6 C | | " | 20 to 30 |

TABLE 1

Substance 1

| Test strains | 128 | 64 | 32 | 16 | 8 | 4 | 2 | 1 | 0.5 |
|---|---|---|---|---|---|---|---|---|---|
| prot. mirabilis | (−) | (−) | (+) | + | + | + | + | + | + |
|  | − | − | − | − | − | − | − | − | − |
| strept. faecal. | (−) | (−) | (−) | (−) |  |  |  | + | + |
|  | − | − | − | − | − | − | − | − | − |
| ent. cloacae | (−) | (−) | (−) | (−) |  | + | + | + | + |
|  | − | − | − | − | − | − | − | − | − |
| e. coli | (−) | (−) | (−) | (−) | − | + | + | + | + |
| candida albicans | (+) | (+) | (+) | (+) | (+) | + | + | + | + |
|  | − | − | − | − | − | − | − | − | − |
| staph. aureus | (−) | (−) | (−) | (−) |  |  |  | + | + |
|  | − | − | − | − | − | − | − | − | − |
| staph. epiderm. | (−) | (−) | (−) | (−) | − | − | − | − | + |
| ps. aeruginosa | (−) | (−) | (−) | (−) |  |  | + | + | + |
|  | − | − | − | − | − | − | − | − | − |

TABLE 2

Substance 3

| Test strains | 128 | 64 | 32 | 16 | 8 | 4 | 2 | 1 | 0.5 |
|---|---|---|---|---|---|---|---|---|---|
| prot. mirabilis | (−) | (−) | (−) | (−) | + | + | + | + | + |
|  | − | − | − | − | − | − | − | − | − |
| strept. faecal. |  |  | (−) | (−) | (−) | (−) |  | + | + |
|  | − | − | − | − | − | − | − | − | − |
| ent. cloacae |  |  | (−) | (−) | (−) | (−) |  | + | + |
|  | − | − | − | − | − | − | − | − | − |
| e. coli |  |  | (−) | (−) | (−) | (−) |  | + | + |
| candida albicans | (−) | (−) | (−) | (−) | (−) | (−) | + | + | + |
|  | − | − | − | − | − | − | − | − | − |
| staph. aureus |  |  | (−) | (−) | (−) | (−) |  | + | + |
|  | − | − | − | − | − | − | − | − | − |
| staph. epiderm. |  |  | (−) | (−) | (−) | (−) | (−) | (−) | + |
| ps. aeruginosa |  | (−) | (−) | (−) | (−) |  |  | + | + |
|  | − | − | − | − | − | − | − | − | − |

TABLE 3

Substance 5

| Test strains | 128 | 64 | 32 | 16 | 8 | 4 | 2 | 1 | 0.5 | 0.25 |
|---|---|---|---|---|---|---|---|---|---|---|
| prot. mirabilis | (−) | (−) | + | + | + | + | + | + | + | + |
|  | − | − |  |  |  |  |  |  |  |  |
| strept. faecal. | (−) | (−) | (−) | (−) | (−) | (−) | (−) | + | + | + |
|  | − | − | − | − | − | − | − |  |  |  |
| ent. cloacae |  |  |  | (−) | (−) | (−) | (−) | + | + | + |
|  | − | − | − | − | − | − | − |  |  |  |
| e. coli |  |  | (−) | (−) | (−) | (−) | + | + | + | + |
|  | − | − | − | − | − | − |  |  |  |  |
| candida albicans | (−) | (−) | (−) | (−) | (−) | (+) | + | + | + | + |
|  | − | − | − | − | − | − |  |  |  |  |
| staph. aureus |  |  |  |  | (−) | (−) | (−) | (−) | + | + |
|  | − | − | − | − |  |  |  |  |  |  |
| staph. epiderm. |  |  |  |  |  | (−) | (−) | (−) | (+) | + |
|  | − | − | − | − | − | − | − | − |  |  |
| ps. aeruginosa |  | (−) | (−) | (−) | (+) |  |  | + | + | + |
|  | − | − | − | − | − | − | − |  |  |  |

TABLE 4

Substance 6

| Test strains | 128 | 64 | 32 | 16 | 8 | 4 | 2 | 1 | 0.5 | 0.25 |
|---|---|---|---|---|---|---|---|---|---|---|
| prot. mirabilis | (−) | (−) | (−) | (−) | + | + | + | + | + | + |
|  | − | − | − | − |  |  |  |  |  |  |
| strept. faecal. |  |  |  |  | (−) | (−) | (−) | (−) | + | + |
|  | − | − | − | − | − | − | − | − |  |  |
| ent. cloacae |  |  |  | (−) | (−) | (−) | (−) |  | + | + |
|  | − | − | − | − | − | − | − | − |  |  |
| e. coli |  |  |  | (−) | (−) | (−) | (−) |  | + | + |
|  | − | − | − | − | − | − | − | − |  |  |
| candida albicans | (−) | (−) | (−) | (−) | (−) | (−) | + | + | + | + |
|  | − | − | − | − | − | − |  |  |  |  |
| staph. aureus |  |  |  |  | (−) | (−) | (−) | (−) | + | + |
|  | − | − | − | − |  |  |  |  |  |  |
| staph. epiderm. |  |  |  |  |  |  | (−) | (−) | (−) |  |

TABLE 4-continued

Substance 6

| Test strains | 128 | 64 | 32 | 16 | 8 | 4 | 2 | 1 | 0.5 | 0.25 |
|---|---|---|---|---|---|---|---|---|---|---|
| ps. aeruginosa | − | − | − | − | − | − | − | − | − | + |
|  |  |  |  | (−) | (−) | (−) | (+) |  |  |  |
|  | − | − | − | − | − | − | − | + | + | + |

TABLE 5

Substance 6 A

| Test strains | 128 | 64 | 32 | 16 | 8 | 4 | 2 |
|---|---|---|---|---|---|---|---|
| ent. cloacae | (−) | (−) | (−) | (−) |  |  |  |
|  | − | − | − | − | + | + | + |
| candida albicans | (+) | (+) | (+) | (+) | (+) |  |  |
|  | − | − | − | − | − | + | + |
| strept. faecalis | (+) | (+) | (+) | (+) | (+) | (+) |  |
|  | − | − | − | − | − | − | + |
| staph. epidermis | (−) | (−) | (−) | (−) | (−) |  |  |
|  | − | − | − | − | − | − | − |
| staph. aureus | (−) | (−) | (−) | (−) |  |  |  |
|  | − | − | − | − | + | + | + |
| prot. mirabilis | (−) | (−) | (−) | (−) |  |  |  |
|  | − | − | − | − | + | + | + |
| e. coli | (−) | (−) | (−) | (−) | (−) | (−) |  |
|  | − | − | − | − | − | − | + |
| ps. aeruginosa | (−) | (−) | (−) | (−) | (−) |  |  |
|  | − | − | − | − | − | + | + |

TABLE 6

Substance 6 B

| Test strains | 128 | 64 | 32 | 16 | 8 | 4 | 2 |
|---|---|---|---|---|---|---|---|
| ent. cloacae | (−) | (−) | (−) | (−) |  |  |  |
|  | − | − | − | − | + | + | + |
| candida albicans | (+) | (+) | (+) |  |  |  |  |
|  | − | − | − | + | + | + | + |
| strept. faecalis | (−) | (−) | (−) | (+) | (+) | (+) |  |
|  | − | − | − | − | − | − | + |
| staph. epidermis | (−) | (−) | (−) | (−) |  |  |  |
|  | − | − | − | − | + | + | + |
| staph. aureus | (−) | (−) | (−) |  |  |  |  |
|  | − | − | − | + | + | + | + |
| prot. mirabilis | (−) | (−) | (−) | (−) | (−) |  |  |
|  | − | − | − | − | − | + | + |
| e. coli | (−) | (−) | (−) | (−) | (−) |  |  |
|  | − | − | − | − | − | + | + |
| ps. aeruginosa | (−) | (−) | (−) | (−) |  |  |  |
|  | − | − | − | − | + | + | + |

TABLE 7

Substance 6 C

| Test strains | 128 | 64 | 32 | 16 | 8 | 4 | 2 |
|---|---|---|---|---|---|---|---|
| ent. cloacae | (−) | (−) | (−) | (−) |  |  |  |
|  | − | − | − | − | + | + | + |
| candida albicans | (+) | (+) | (+) | (+) |  |  |  |
|  | − | − | − | + | + | + | + |
| strept. faecalis | (−) | (−) | (−) | (−) |  |  |  |

TABLE 7-continued

Substance 6 C

| Test strains | 128 | 64 | 32 | 16 | 8 | 4 | 2 |
|---|---|---|---|---|---|---|---|
| staph. epidermis | (−) | (−) | (−) | (−) | (−) |  |  |
|  | − | − | − | − | − | + | + |
| staph. aureus | (−) | (−) | (+) | (+) |  |  |  |
|  | − | − | − | − | + | + | + |
| prot. mirabilis | (−) | (−) | (−) | (−) |  |  |  |
|  | − | − | − | − | + | + | + |
| e. coli | (−) | (−) | (−) | (−) | (−) |  |  |
|  | − | − | − | − | − | + | + |
| ps. aeruginosa | (−) | (−) | (−) | (−) |  |  |  |
|  | − | − | − | − | + | + | + |

1.2 Examination of antiviral effect

The substances to be examined were tested as to their effectiveness against two species of *legionella pneumophila* in an agar diffusion test. The culture medium used was legionella—CYE—agar (oxoid). Two concentrations respectively of the test substances (2.5 mg/ml and 25 mg/ml) were tested, whereby 50 µl were respectively placed on the test plates, i.e. 0.125 µg resp. 1.25 µg per test plate.

At 1.25 µg concentration, Substance No. 5 caused an inhibition perimeter of 17 mm diameter; at the low concentration of 0.125 µg no effect was detectable.

At 1.25 µg concentration, Substance No. 6 caused an inhibition perimeter of 20 mm; at 0.125 µg concentration, it caused an inhibition perimeter 7–8 mm in diameter.

The inhibition perimeters were the same for both test strains.

2. Toxicological tests

In view of the known strong interaction between polyionenes and nucleic acid, tests were conducted to examine the mutagenic potential of the polyionenes used as the coating material on the basis of Substance No. 6 (6,10-ionen bromide). The test method of Ames was used (viz. *Proc. Natl. Acad. Sci.* (USA) vol. 70, pp. 2281–2285 (1973); B. J. Kilbey et al. (ed.) "Handbook of Mutagenicity Test Procedures", Elsevier, Amsterdam, pp. 1–17 (1977); *Mutation Res.* vol. 113, pp. 173–215 (1983); and ibid. vol. 189, pp. 83–91 (1987)). This test is based on the principle of re-mutation of different selected strains of *salmonella typhimurium* from histidin dependence (auxotrophia) to histidin independence (prototrophia) with increased frequency in the presence of a mutagene. A test substance giving rise to a reproduceable and statistically significant increase in the number of re-mutated bacteria in relation to the dose is called a mutagene. A test substance which causes neither a statistically significant increase in the number of remutating bacteria in relation to the dose, nor a statistically significant and reproduceable positive reaction at an arbitrary test point is defined as non-mutagenic in this test system.

Two independent mutagenicity tests were conducted, each respectively both in the presence and in the absence of an external metabolic activation system (rat liver mixture S9). The metabolic activation system consisted of an S9 liver homogenate, produced by rats induced with Aroclor 1254 (Organon Teknika, Eppelheim; lot 32957), which was supplemented with 5 nM glucose-6 phosphate, 4 mM β-nicotineamide adenine dinucleotide phosphate (NADP). 100 mM phosphate buffers of 7.6 pH-value, 8 mM $MgCl_2$ and 33 mM KCl.

No statistically significant increase of colony formation beyond the spontaneous re-mutation rates of the salmonella strains in relation to the concentration was observed in any of the tested concentrations (0.01 to 1.0 mg/plate). This shows that the tested substance is not mutagene in *salmonella typhimurium* under the condition described above.

In addition Substance No. 6 was subjected to a growth inhibition test regarding a potential cytotoxic effect. In this test system reduced cell growth is determined in the presence of toxic substances by means of determining the protein content of untreated control cultures after an incubation period of 72 hours. The protein content is an indirect measure of cell growth with regard to the growth inhibition caused by toxic substances. Growth inhibition of more than 30% in comparison to the untreated cultures (negative controls) is regarded as a clear cytotoxic effect.

The substance to be tested was dissolved and serially diluted with the cell culture medium (DMEM-FCS) down to final concentrations of 2.6; 4.0; 5.9; 8.8; 13.3 and 20.0 μg/ml. L929 cell cultures were incubated for 72 hours in the presence of the different concentrations of the test substance. L929 cells ATCC No. CCL1, NCTC clone 929 (connective tissue of mice, clone of strain L) were used as the test organism. DMEM (Dulbecco's modified eagle medium, Art. No. 041-01965 M) was supplemented with 10% fetal calves serum FCS, 100 μg/ml penicillin and 100 μg/ml streptomycin. DMEM-FCS without test substance was used as the negative control and dimethyl sulfoxide (7.5% V/V DMSO) as the positive control. 100 μl of the test solutions resp. 100 μl of the controls were injected three times respectively in the holes of a tissue plate with 96 holes. Then 50 ml of a freshly prepared cell suspension with a $1\times10^5$ per 1 ml content of cells were injected into all the holes, with the exception of those serving for background determination. The tissue plates were incubated in moist air (5% $CO_2$/95% air) at 97° C. for 72 hours. The protein content of each hole was determined with the aid of the colorimetric BCA protein test method (viz. *Analytical Biochemistry*, vol. 150, pp. 76–85 (1985)). It was demonstrated that in a concentration of more than 4 μg/ml, Substance 6 displayed cytotoxical effects during a permanent contact period of 72 hours.

3. Tests of bacteria adhesion behavior of polysulfone plates coated with polyionenes According to the process of Example 1 Substance No. 6 (6.10-ionen bromide) was applied to polysulfone plates of 1×1 size. Three plates of the coated polysulfone and 3 uncoated plates as the control were subjected to the following test to determine the antiadhesive properties of the substance.

*Staphylococcus epidermitis* KH6 (24-hour culture in CASO-bouillon at 37° C.) was used as the bacteria strain. After washing twice in PBS (20 mM potassium phosphate buffer in isotonic normal saline solution with 7.8 pH-value) the base suspension was produced in PBS. It displayed extinction at 545 nm of 0.0589, which corresponds to a bacteria count of $1.6\times10^7$. The plates to be tested were placed into the base suspension; the storage during the incubation period of 90 min at room temperature was effected on a roller mixer. After completion of the incubation period the material was washed three times in app. 20 ml PBS, for 5 sec each time, and then washed once with Ampuwa. Fixation followed for 30 min at 80° C. For fluorescence-microscopic evaluation the plates were tinted with acridine orange for 5 min. For evaluation, a 100 objective with oil was used. The results are shown in the following Table 8. They confirm the pronounced antiadhesive nature of the polyionenes coating, which prevent the formation of biofilm.

TABLE 8

Results of the count of the coated plates and the control; evaluated surface:

| Sample | Mean of 20 visual fields | X | lowest - highest val. |
| --- | --- | --- | --- |
| coated | 11.2 | | 0–30 |
| coated | 5.20 | 7.72 | 0–18 |
| coated | 6.75 | | 0–21 |
| uncoated | 30.1 | | 1–139 |
| uncoated | 25.6 | 33.80 | 1–81 |
| uncoated | 45.7 | | 1–247 |

We claim:

1. A matrix comprising a chemically inert material and a coating of polyionenes having an antimicrobial effect, wherein the polyionenes do not form direct covalent or ionic bonds to the chemically inert material, but are so firmly bound to the chemically inert material that they have low solubility in aqueous media, said matrix is produced by a process for immobilizing polyionenes soluble in a hydrophilic solvent on a chemically inert carder material, wherein said process is characterized in that the two terminal reactive groups of the polyionenes are reacted with an excess of an αω-bifunctional compound, the reaction product obtained and then dissolved in a hydrophilic solvent is applied at least once to the carrier material and then cross-linked with a cross-linking agent dissolved in a hydrophobic solvent which is inert to the cross-linking agent and the carrier material, whereby the polyionenes is one of the general Formula I, as shown below:

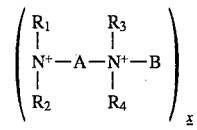

wherein x designates the degree of polymerization, $R_1$, $R_2$, $R_3$, and $R_4$, which may be identical or different, each being straight or branched-chain alkyl groups with 1 to 4 carbon atoms, and A and B, which may be identical or different, respectively designate one of the groups —$CH_2$—, —$C_2H_4$— or

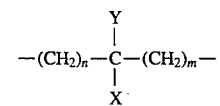

with the proviso that the sum of the carbon atoms in the two groups A and B is at least 6, whereby n and m respectively is an integer between 1 and 16 and X and Y are selected from the group consisting of: —H, —$CH_3$, —OH, —CHO, —$NH_2$, NHZ, —$N(Z)_2$, wherein X and Y can be the same or different, whereby Z is an alkyl group with 1 to 4 carbon atoms and the substituents Z in —N(Z), and NZ may be the same or different, or represent the group

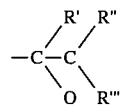

wherein R', R" and R'", which may be identical or different, respectively represent a hydrogen atom or an alkyl group with 1 to 6 carbon atoms, or X and Y together represent an oxygen atom, whereby the molecular weight of the polyionenes is in the range of 10,000 to 100,000 Dalton.

2. Matrix according to claim 1, wherein the coating comprises the reaction product of terminal reactive groups of a linear polyionene polymer with an alpha-, omega-bifunctional compound.

3. Matrix according to claim 1, wherein the chemically inert material is a polymeric resin.

4. Matrix according to claim 3, wherein the polymeric resin is a polysulfone.

5. Matrix according to claim 1, in the form of a microporous membrane.

6. Matrix according to claim 1, in the form of beads.

7. The matrix of claim 1, wherein the molecular weight of the polyionenes is in the range of 20,000 to 80,000 Dalton.

8. In a method of purifying an aqueous solution comprising filtering the solution through a filter to remove one or more impurities, the improvement comprising using as the filter a matrix comprising a chemically inert material and a coating of polyionenes having an antimicrobial effect, wherein the polyionenes do not form direct covalent or ionic bonds to the chemically inert material, but are so firmly bound to the chemically inert material that they have low solubility in aqueous media, said matrix being prepared by a process for immobilizing polyionenes soluble in a hydrophilic solvent on a chemically inert carrier material, wherein said process is characterized in that the two terminal reactive groups of the polyionenes are reacted with an excess of an $\alpha, \omega$-bifunctional compound, the reaction product obtained and then dissolved in a hydrophilic solvent is applied at least once to the carrier material and then cross-linked with a cross-linking agent dissolved in a hydrophobic solvent which is inert to the cross-linking agent and the carrier material, whereby the polyionenes is one of the general Formula I, as shown below:

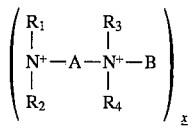

wherein x designates the degree of polymerization, $R_1$, $R_2$, $R_3$, and $R_4$ which may be identical or different, each being straight or branched-chain alkyl groups with 1 to 4 carbon atoms, and A and B, which maybe identical or different, respectively designate one of the groups $-CH_2-$, $-CH_4-$ or

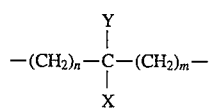

with the proviso that the sum of the carbon atoms in the two groups A and B is at least 6, whereby n and m respectively is an integer between 1 and 16 and X and Y are selected from the group consisting of: $-H$, $-CH_3$, $-OH$, $-CHO$, $-NH_2$, $NHZ$, $-N(Z)_2$, wherein X and Y can be the same or different, whereby Z is an alkyl group with 1 to 4 carbon atoms and the substituents Z in $-N(Z)$, and NZ may be the same or different, or represent the group

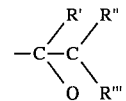

wherein R', R" and R'", which may be identical or different, respectively represent a hydrogen atom or an alkyl group with 1 to 6 carbon atoms, or X and Y together represent an oxygen atom, whereby the molecular weight of the polyionenes is in the range of 10,000 to 100,000 Dalton.

9. The method of claim 8, wherein the molecular weight of the polyionenes is in the range of 20,000 to 80,000 Dalton.

10. In a method of surface disinfecting an aqueous solution comprising contacting the surface of the aqueous solution with a disinfectant, the improvement comprising using as the disinfectant beads prepared from a matrix comprising a chemically inert material and a coating of polyionenes having an antimicrobial effect, wherein the polyionenes do not form direct covalent or ionic bonds to the chemically inert material, but are so firmly bound to the chemically inert material that they have low solubility in aqueous media, wherein said method comprises immobilizing polyionenes soluble in a hydrophilic solvent on a chemically inert carrier material, characterized in that the two terminal reactive groups of the polyionenes are reacted with an excess of an $\alpha, \omega$-bifunctional compound, the reaction product obtained and then dissolved in a hydrophilic solvent is applied at least once to the carrier material and then cross-linked with a cross-linking agent dissolved in a hydrophobic solvent which is inert to the cross-linking agent and the carrier material, whereby the polyionenes is one of the general Formula I, as shown below:

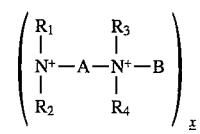

wherein x designates the degree of polymerization, $R_1$, $R_2$, $R_3$ and $R_4$, which may be identical or different, each being straight or branched-chain alkyl groups with 1 to 4 carbon atoms, and A and B, which may be identical or different, respectively designate one of the groups $-CH_2-$, $-CH_4-$ or

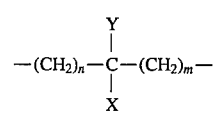

with the proviso that the sum of the carbon atoms in the two groups A and B is at least 6, whereby n and m respectively is an integer between 1 and 16 and X and Y are selected from the group consisting of: $-H$, $-CH_3$, $-OH$, $-CHO$, $-NH_2$, $NHZ$, $-N(Z)_2$, wherein X and Y can be the same or different, whereby Z is an alkyl group with 1 to 4 carbon atoms and the substituents Z in $-N(Z)$, and NZ may be the same or different, or represent the group

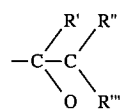
wherein R', R" and R'", which may be identical or different, respectively represent a hydrogen atom or an alkyl group with 1 to 6 carbon atoms, or X and Y together represent an oxygen atom, whereby the molecular weight of the polyionenes is in the range of 10,000 to 100,000 Dalton.
11. The method of claim 10, wherein the molecular weight of the polyionenes is in the range of 20,000 to 80,000 Dalton.
* * * * *